G. VEALE, Jr.
STOP AND WASTE COCK.
No. 181,502. Patented Aug. 22, 1876.
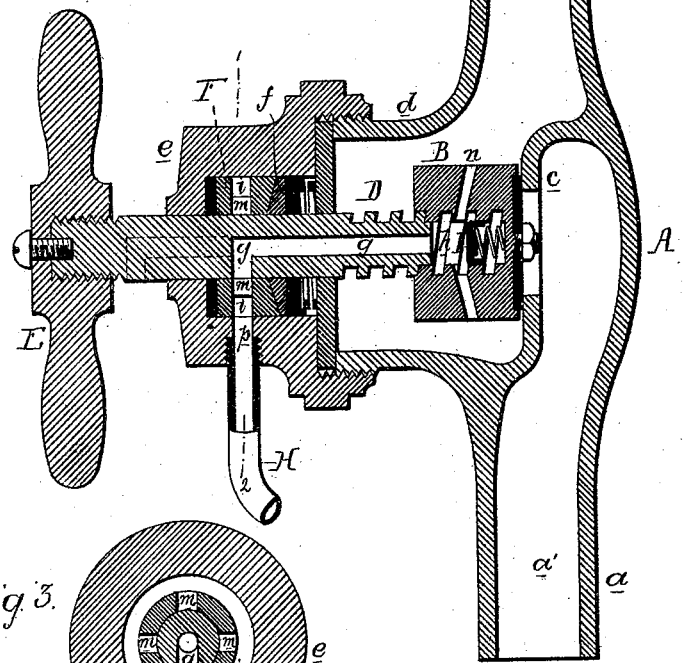
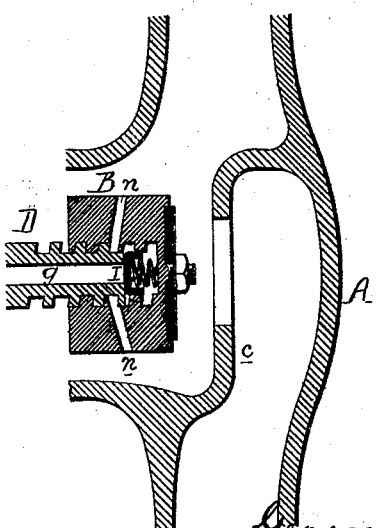
Witnesses Ellwood T. Deetz, Harry Smith
George Veale Jr.
by his Attorneys
Howson and Son

UNITED STATES PATENT OFFICE.

GEORGE VEALE, JR., OF PHILADELPHIA, PENNSYLVANIA.

IMPROVEMENT IN STOP AND WASTE COCKS.

Specification forming part of Letters Patent No. 181,502, dated August 22, 1876; application filed July 10, 1876.

*To all whom it may concern:*

Be it known that I, GEORGE VEALE, Jr., of Philadelphia, Pennsylvania, have invented a Combined Stop and Waste Cock, of which the following is a specification:

The object of my invention is to construct a combined stop and waste cock; and this object I attain in the manner which I will now proceed to describe, reference being had to the accompanying drawing, in which—

Figure 1 is a section of my combined stop and waste cock; Fig. 2, part of Fig. 1, showing the working parts in a different position; and Fig. 3, a section on the line 1 2, Fig. 1.

A is the casing of the valve, having the usual branches $a$ and $b$, a partition with opening and valve-seat $c$, and tubular projection $d$, closed by a cap, $e$. The branch $a$ communicates with the supply-pipe, and the branch $b$ with the discharge-pipe. Communication between the two branches is governed by means of a valve, B, which has a threaded recess, $h$, adapted to the threaded end of a stem, D, passing through the cap $e$, and furnished with an operating-handle, E, this stem turning in the cap, but being confined longitudinally by means of its collar $f$. Between this collar $f$ and the end of the recess in the cap $e$ intervenes a ring, F, in the edge of which is formed a groove, $i$, which communicates, through one of a number of openings, $m$, in the ring, with a passage, $g$, formed in the valve-stem D.

In the inner end of the threaded recess $h$ of the valve B is arranged a small spring-valve, I, and in the body of the valve B are formed openings $n$, which serve to form communications between said recess $h$ and the discharge-passage $b'$ of the cock.

In the cap $e$, in line with the recess $i$ of the ring F, is formed an opening, $p$, into the outer end of which is screwed a small nozzle, H. When the parts of the cock are in the position shown in Fig. 1, waste-water from the branch $b$ and the pipe communicating therewith passes freely through the openings $n$ and recess $h$ in the valve, through the passage $g$ of the valve-stem, through one of the openings $m$ and groove $i$ of the ring F, and is finally discharged through the nozzle H, which forms a continuation of the opening $p$ in the cap E. When the valve B is opened, however, to permit the passage of water from the branch $a$ to the branch $b$, the supplementary valve I bears against the end of the valve-stem D, closing the passage $g$ of the same, and preventing the escape of water until it is removed by the closing of the valve B, when the escape of the waste-water takes place, as before.

In cheap cocks the use of the ring F and nozzle H may be dispensed with, and the water may discharge directly from one side of the stem D, as shown by dotted lines, Fig. 1; or the passage $g$ may be carried up still farther and communicate with a discharge-passage in the handle E.

I claim as my invention—

1. The combination of the fixed stem D and its passage $g$ with the sliding valve B, its openings $n$, and yielding valve I, as set forth.

2. The combination of the ring F, its recess $i$, and openings $m$, with the valve-stem D and its recess $g$, and with the cap $e$ and its opening $p$.

In testimony whereof I have signed my name to this specification in the presence of two subscribing witnesses.

GEORGE VEALE, JR.

Witnesses:
ELLWOOD F. DEETZ,
HARRY SMITH.